(12) United States Patent  
Taillefer

(10) Patent No.: US 8,099,719 B2  
(45) Date of Patent: Jan. 17, 2012

(54) TRANSACTIONAL DEBUGGER FOR A TRANSACTIONAL MEMORY SYSTEM AND DETECTING CONFLICTS

(75) Inventor: Martin Taillefer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1240 days.

(21) Appl. No.: 11/820,284

(22) Filed: Jun. 19, 2007

(65) Prior Publication Data

US 2008/0320334 A1    Dec. 25, 2008

(51) Int. Cl.
G06F 9/44 (2006.01)
G06F 9/45 (2006.01)

(52) U.S. Cl. .......................... 717/131; 717/124; 717/130

(58) Field of Classification Search .......... 717/124–131, 717/149–151
See application file for complete search history.

(56) References Cited

U.S. PATENT DOCUMENTS

| | | | |
|---|---|---|---|
| 5,157,777 A | 10/1992 | Lai et al. | |
| 5,317,740 A * | 5/1994 | Sites ............................ | 717/129 |
| 5,774,717 A | 6/1998 | Porcaro | |
| 5,999,987 A | 12/1999 | O'Farrell et al. | |
| 6,085,035 A | 7/2000 | Ungar | |
| 6,138,269 A | 10/2000 | Ball | |
| 6,226,787 B1 * | 5/2001 | Serra et al. ..................... | 717/125 |
| 6,324,683 B1 * | 11/2001 | Fuh et al. ...................... | 717/124 |
| 6,467,052 B1 * | 10/2002 | Kaler et al. ..................... | 714/39 |
| 6,552,585 B2 * | 4/2003 | Poullet .......................... | 327/115 |
| 6,553,384 B1 | 4/2003 | Frey et al. | |
| 6,654,760 B2 | 11/2003 | Baskins et al. | |
| 6,826,757 B2 | 11/2004 | Steele, Jr. et al. | |
| 6,954,923 B1 * | 10/2005 | Yates et al. ..................... | 717/130 |
| 6,959,405 B2 | 10/2005 | Hite et al. | |
| 7,013,456 B1 * | 3/2006 | Van Dyke et al. ............. | 717/130 |
| 7,058,954 B1 | 6/2006 | Wollrath et al. | |
| 7,076,784 B1 | 7/2006 | Russell et al. | |
| 7,254,806 B1 * | 8/2007 | Yates et al. ..................... | 717/136 |
| 7,316,005 B2 * | 1/2008 | Qadeer et al. .................. | 717/131 |
| 7,716,645 B2 * | 5/2010 | Dolby et al. ................... | 717/126 |
| 7,721,263 B2 * | 5/2010 | Swoboda ....................... | 717/124 |
| 7,752,605 B2 * | 7/2010 | Qadeer et al. .................. | 717/127 |
| 7,770,153 B2 * | 8/2010 | Chilimbi et al. ............... | 717/127 |

(Continued)

FOREIGN PATENT DOCUMENTS

GB    2239334 A    6/1991

OTHER PUBLICATIONS

Zamfir et al, "Execution synthesis a technique for automated software debugging", ACM EuroSys, pp. 321-334, 2010.*

(Continued)

*Primary Examiner* — Anil Khatri

(57) ABSTRACT

Various technologies and techniques are disclosed for providing a debugger for programs running under a transactional memory system. When running a particular program using the debugger, the system detects when a conflict occurs on at least one conflictpoint that was set in the particular program. A graphical user interface is provided that displays information related to the detected conflict. The graphical user interface can display transactional state and/or other details independently of a conflict. A conflictpoint can be assigned to one or more regions of source code in one or more transactions in the particular program. A conflictpoint can also be assigned to a particular variable in the particular program. When running the particular program in a debug mode, execution is stopped if a conflict occurs on any of the conflictpoints.

16 Claims, 12 Drawing Sheets

U.S. PATENT DOCUMENTS

| | | | |
|---|---|---|---|
| 7,784,035 B2 * | 8/2010 | Kahlon et al. | 717/133 |
| 7,818,723 B2 * | 10/2010 | AliKacem et al. | 717/131 |
| 7,840,947 B2 * | 11/2010 | Lev et al. | 717/124 |
| 7,849,446 B2 * | 12/2010 | Lev et al. | 717/124 |
| 7,921,407 B2 * | 4/2011 | Damron et al. | 717/106 |
| 2004/0185876 A1 | 9/2004 | Groenendaal et al. | |

OTHER PUBLICATIONS

Aral et al, "Parasight: A high level debugger/profiler architecture for shared memory multiprocessors", ACM pp. 131-139, 1988.*

Kingsbury, "Organizing processes and threads for debugging", ACM PADTAD, pp. 21-26, 2007.*

Saha et al, "Architectural support for software transactional memory", IEEE MICRO, pp. 1-12, 2006.*

Chung et al, "ASF: AMD64 extension for lock free data structures and transactional memory", IEEE, pp. 39-50, 2010.*

Zyulkyrov et al, "Debugging programs that use atomic block and transactional memory", ACM PPoPP, pp. 57-66, 2010.*

Herlihy, et al., "Software Transactional Memory for Dynamic-Sized Data Structures," Date: Jul. 13, 2003-Jul. 16, 2003, pp. 1-12.

Shaughnessy, Managed Code Database Advantage for the Microsoft .NET Framework Platform, http://bdn1.borland.com/borcon2004/article/paper/0,1963,32236,00.html.

International Search Report and Written Opinion Received for PCT Application No. PCT/US2008/066118, mailed on Dec. 30, 2008, 10 pages.

Herlihy, Maurice et al., "Transactional Memory: Architectural Support for Lock-Free Data Structures", ISCA '93 Proceedings of the 20th annual international symposium on computer architecture, ACM New York, NY, USA, 1993, 12 pages.

* cited by examiner

TRANSACTIONAL DEBUGGER FOR A TRANSACTIONAL MEMORY SYSTEM AND DETECTING CONFLICTS

BACKGROUND

Steadily over time computers have become much more powerful, with more processing power and memory to handle advanced operations. This trend has recently shifted away from a focus on ever-increasing single-processor clock rates and towards an increase in the number of processors available in a single computer. Software developers want to take advantage of improvements in computer processing power, enabling their software programs to be executed faster as new hardware is adopted. With the new hardware trends, however, this requires a different approach: developers must arrange for one or more tasks of a particular software program to be executed "concurrently" (sometimes called "in parallel"), so that the same logical operation can utilize many processors at one time, and deliver better performance as more processors are added to the computers on which such software runs.

Transactional memory is designed to ease development of concurrent programs by providing atomicity and isolation to regions of program code. Transactional memory (TM) is a concurrency control mechanism analogous to database transactions for controlling access to shared memory in concurrent computing. A transaction in the context of transactional memory is a piece of code that executes a series of reads and writes to shared memory. TM is used as an alternative to traditional locking mechanisms. TM allows concurrent programs to be written more simply. A transaction specifies a sequence of code that is supposed to execute as if it were executing in isolation. This illusion of isolation is achieved by fine-grained locking of objects, and by executing in a mode that allows the effects of the transaction to be rolled back if the transaction is discovered to be in conflict with some other transaction. We say that a data access is "transacted" if the access is protected by these locking and rollback mechanisms As transactional memory programming models are deployed, programmers will begin to experience performance problems around the use of transactions. Transactional semantics cause code sequences to experience conflicts with one another, leading to the need to re-execute code sequences to resolve the conflicts. This re-execution of code hurts performance in the form of lower scalability and higher energy consumption and must be minimized. In other words, the software must be designed to minimize the occurrence of transactional conflicts. The problem, however, is that existing debugging systems do not support the ability to easily diagnose, discover, and correct performance and correctness issues related to memory transactions.

SUMMARY

A debugger for programs running under a transactional memory system detects when a conflict occurs on at least one conflictpoint that was set in the particular program. Information related to the detected conflict, such as transactional state of pending transactions, transactional state of transactions and/or other related details independently of a conflict can be displayed. For example, a conflictpoint can be assigned to one or more regions of source code in one or more transactions in the particular program and/or a particular variable in the particular program. When running the particular program in a debug mode, execution is stopped if a conflict occurs on any of the conflictpoints.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
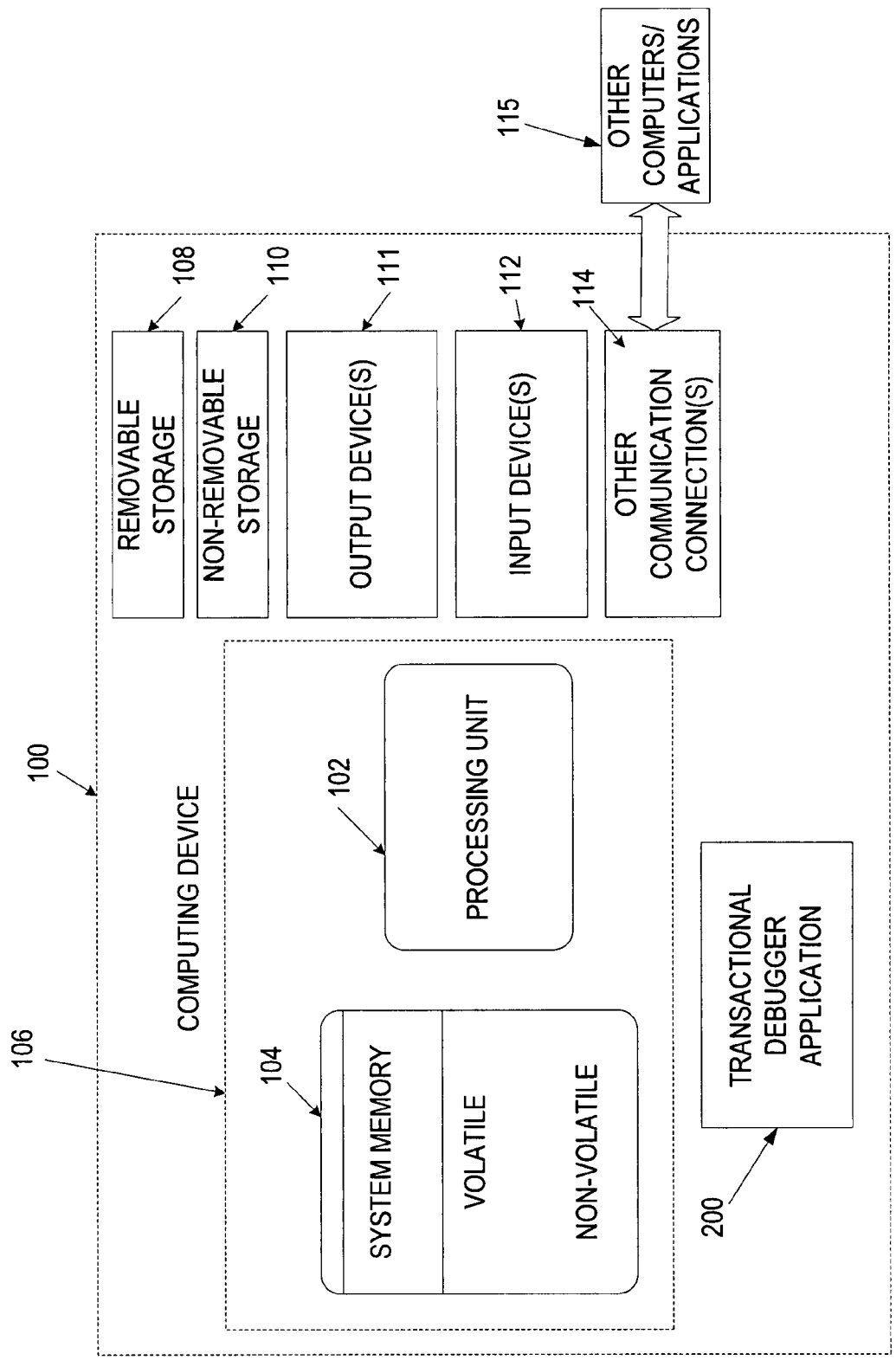
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a debugger for transactions in a program operating under a transactional memory system, but the system also serves other purposes in addition to these. In one implementation, one or more of the techniques described herein can be implemented as features within a software development program such as MICROSOFT® VISUAL STUDIO®, or from any other type of program or service that allows transactions in programs operating under a transactional memory system to be debugged.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display, speakers, printer, etc. may also be included. These devices are well known in the art and need not be discussed at length here. In one implementation, computing device 100 includes transactional debugger application 200. Transactional debugger application 200 will be described in further detail in FIG. 2.

Figure 2:
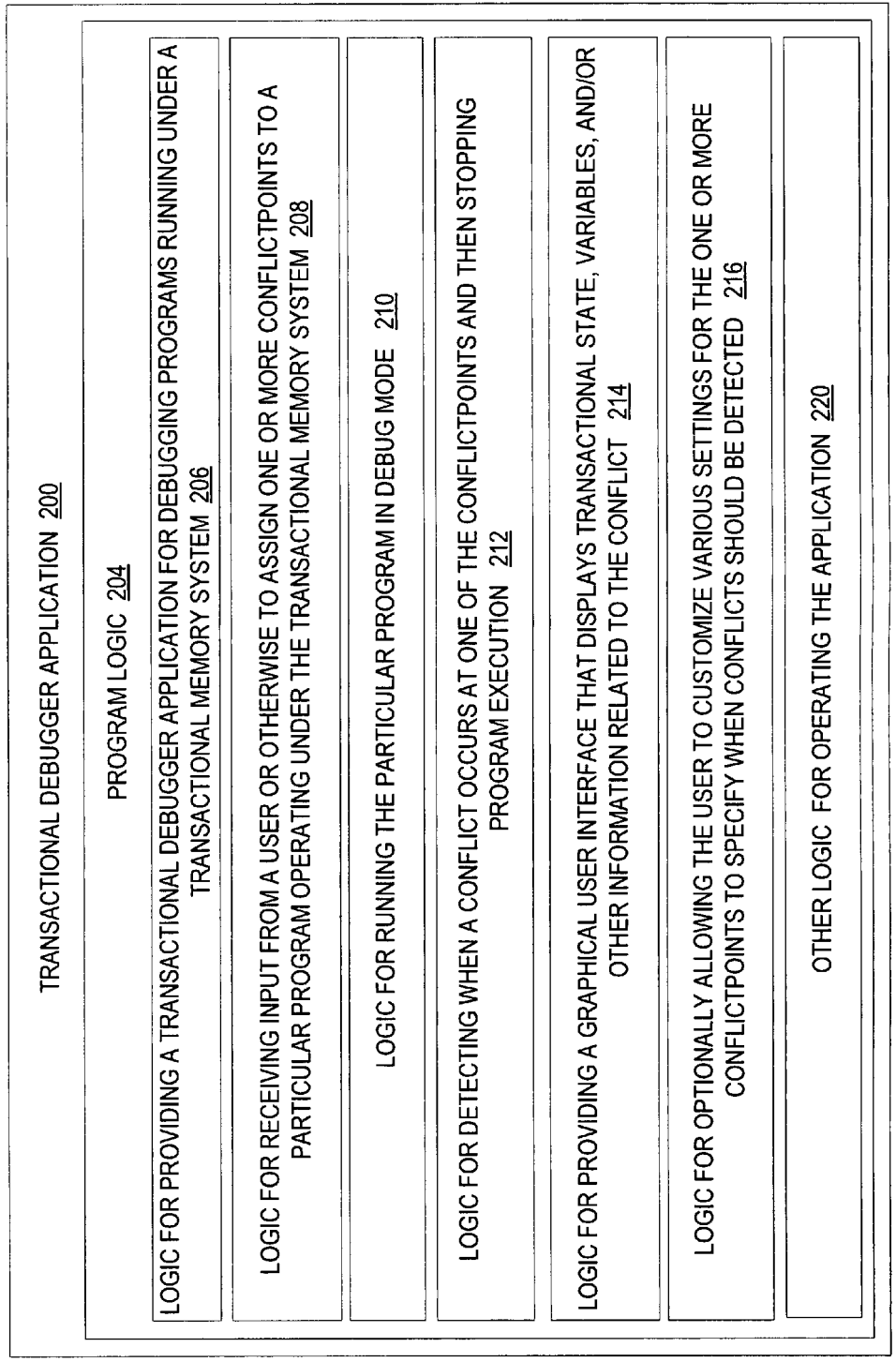
FIG. 2 is a diagrammatic view of a transactional debugger application of one implementation operating on the computer system of FIG. 1.

Turning now to FIG. 2 with continued reference to FIG. 1, a transactional debugger application 200 operating on computing device 100 is illustrated. Transactional debugger application 200 is one of the application programs that reside on computing device 100. However, it will be understood that transactional debugger application 200 can alternatively or additionally be embodied as computer-executable instructions on one or more computers and/or in different variations than shown on FIG. 1. Alternatively or additionally, one or more parts of transactional debugger application 200 can be part of system memory 104, on other computers and/or applications 115, or other such variations as would occur to one in the computer software art.

Transactional debugger application 200 includes program logic 204, which is responsible for carrying out some or all of the techniques described herein. Program logic 204 includes logic for providing a transactional debugger application for debugging programs running under a transactional memory system 206; logic for receiving input from a user or otherwise to assign one or more conflictpoints to particular program operating under the transactional memory system 208; logic for running the particular program in debug mode 210; logic for detecting when a conflict occurs at one of the conflictpoints and then stopping program execution 212; logic for providing a graphical user interface that displays transactional state, variables, and/or other information related to the conflict 214; logic for optionally allowing the user to customize various settings for the one or more conflictpoints to specify when conflicts should be detected 216; and other logic for operating the application 220. In one implementation, program logic 204 is operable to be called programmatically from another program, such as using a single call to a procedure in program logic 204.

Figure 3:
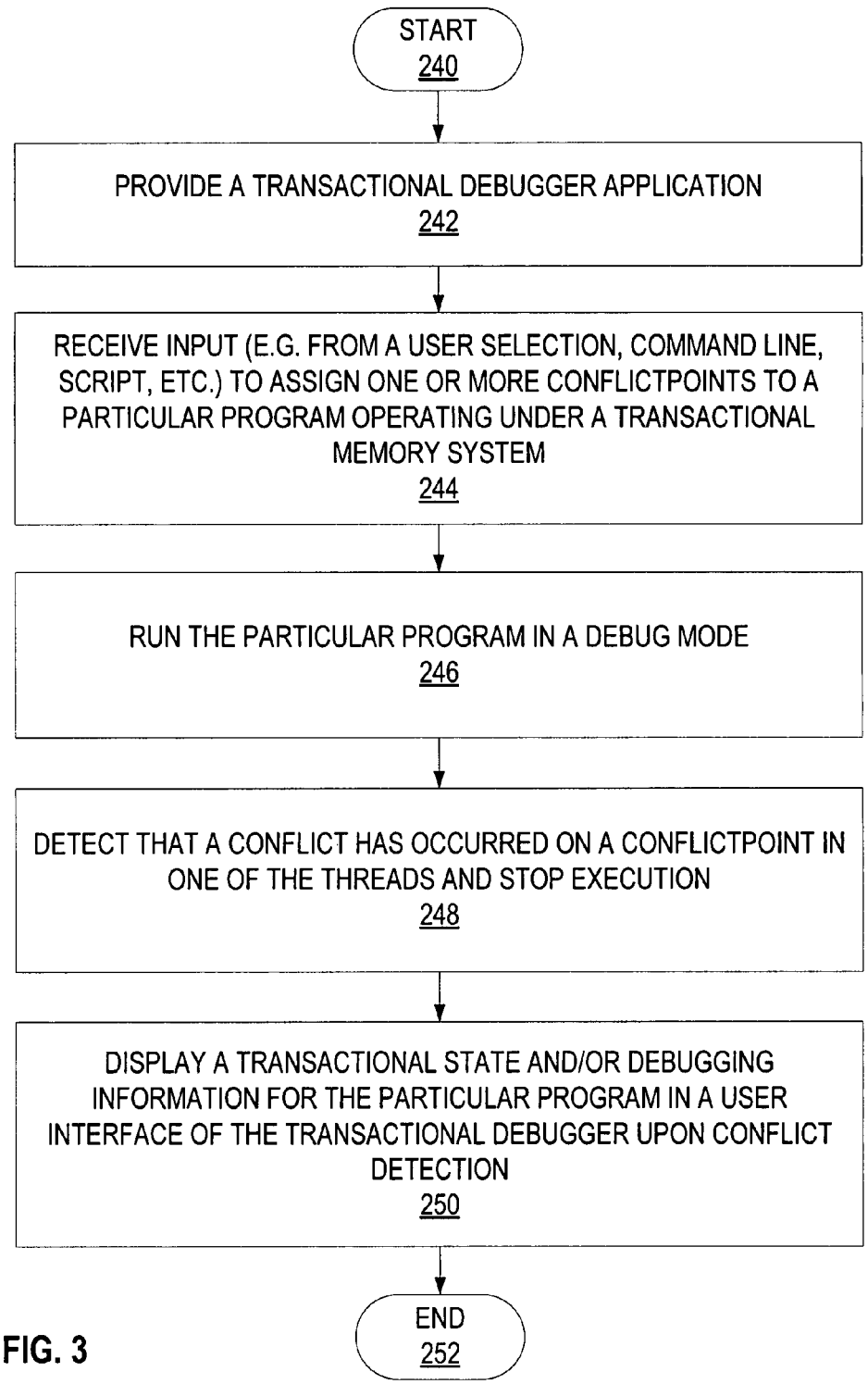
FIG. 3 is a process flow diagram for one implementation of the system of FIG. 1 illustrating the stages involved in providing a debugger user interface for a transactional memory system.

Turning now to FIGS. 3-6 with continued reference to FIGS. 1-2, the stages for implementing one or more implementations of transactional debugger application 200 are described in further detail. FIG. 3 illustrates one implementation of the stages involved in providing a debugger user interface for a transactional memory system. In one form, the process of FIG. 3 is at least partially implemented in the operating logic of computing device 100. The process begins at start point 240 with providing a transactional debugger application (stage 242). The system receives input (e.g. from a user selection, command line, script, etc.) to assign one or more conflictpoints to a particular program operating under a transactional memory system (stage 244). The system runs the particular program in a debug mode (stage 246), detects when a conflict has occurred on a conflictpoint in one of the threads, and stops execution (stage 248). The transactional state and/or debugging information for the particular program are displayed in a user interface of the transactional debugger upon conflict detection (stage 250). The user interface can alternatively or additional display transactional state, variable values, and/or other debugging information for the particular program independently of a particular conflict being detected. The process ends at end point 252.

Figure 4:
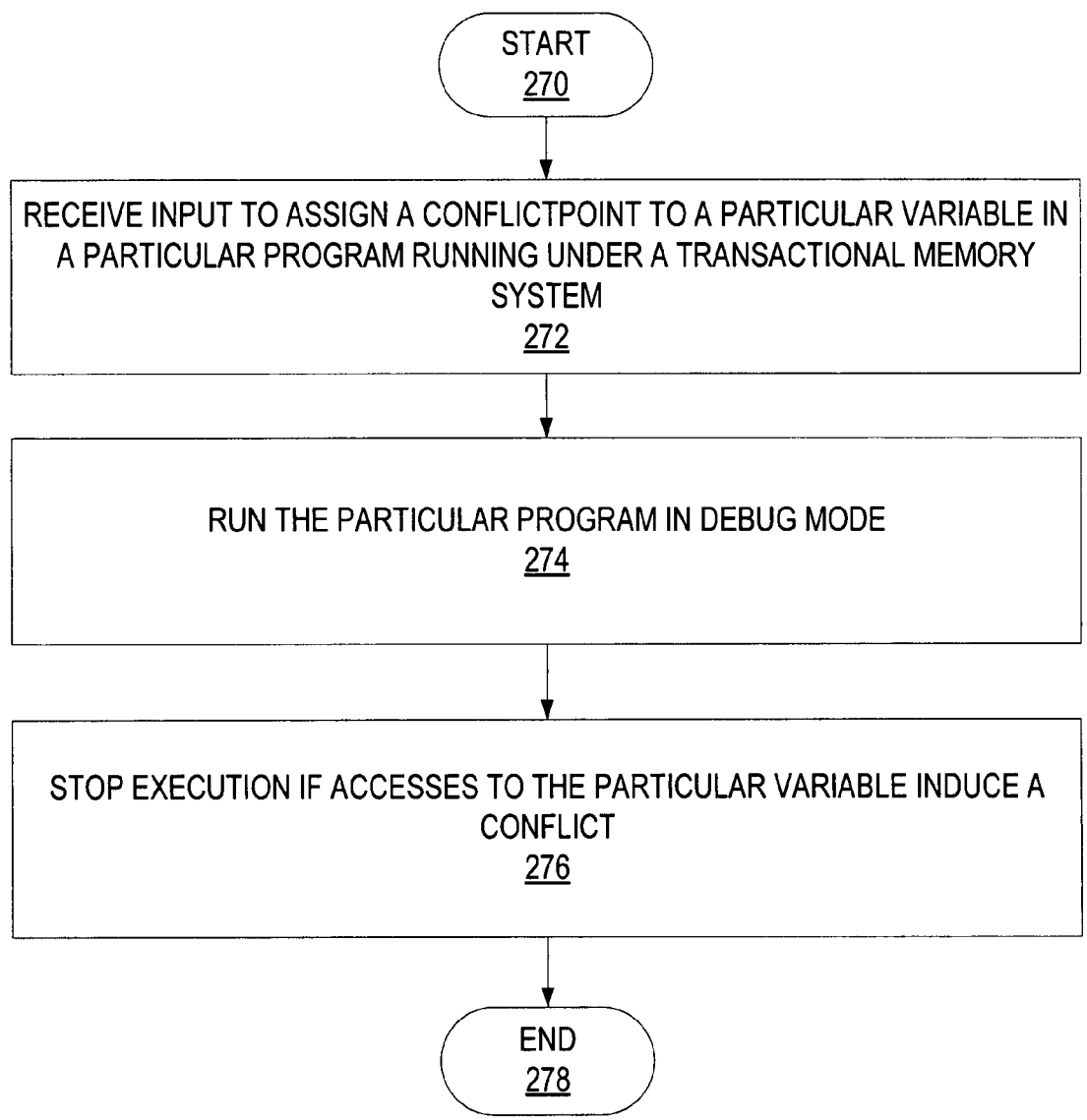
FIG. 4 is a process flow diagram for one implementation of the system of FIG. 1 illustrating the stages involved in using a conflictpoint on a variable in a particular program running under a transactional memory system.
Figure 5:
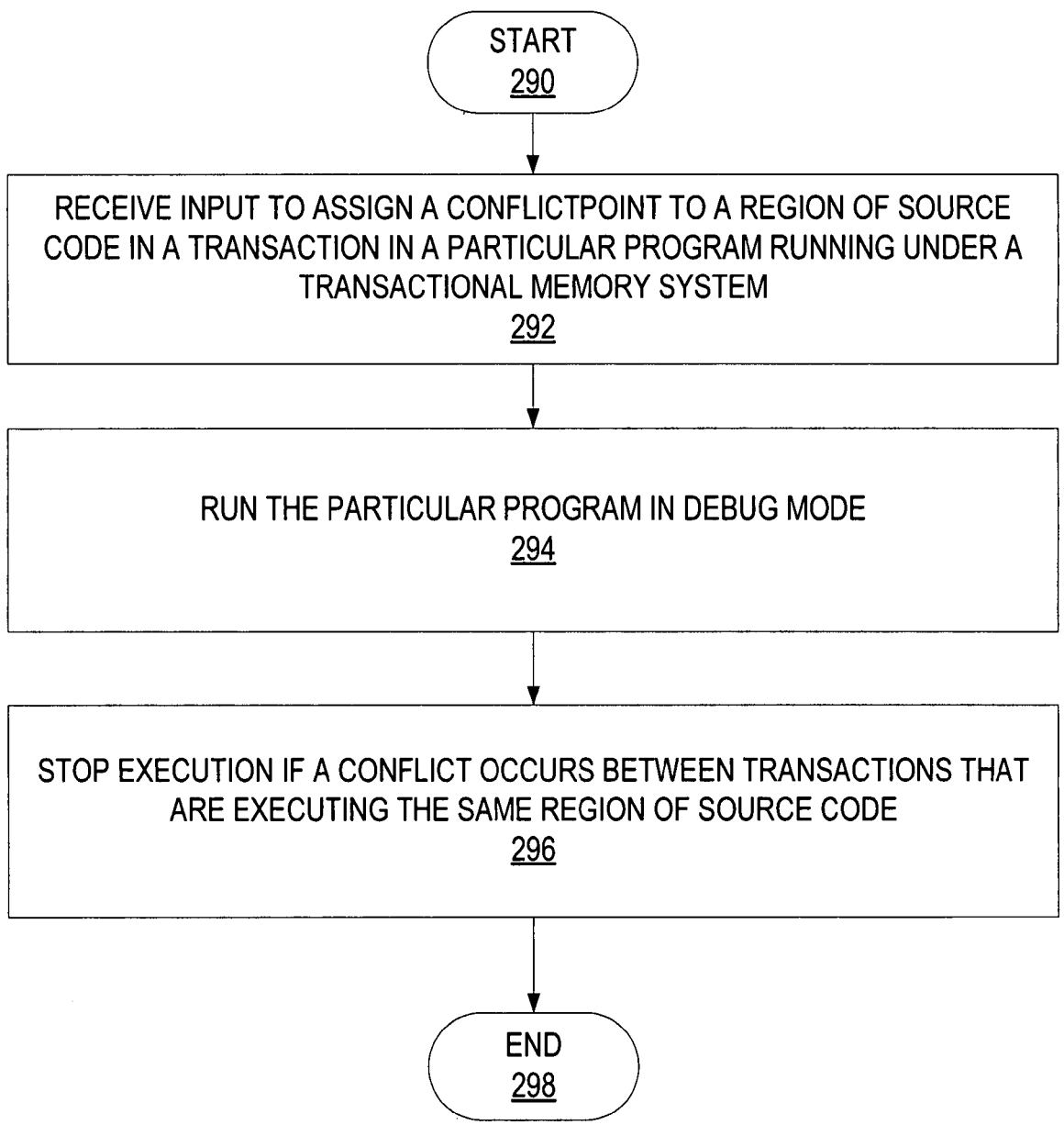
FIG. 5 is a process flow diagram for one implementation of the system of FIG. 1 illustrating the stages involved in using a conflictpoint with a region of source code in a transaction.

Turning now to FIGS. 4 and 5, examples of assigning and using conflictpoints are described. It should be appreciated that while FIGS. 4 and 5 each discuss assigning a single conflictpoint, it will be appreciated that one or more conflictpoints of one or more types can be assigned depending on the debugging desires of the user. FIGS. 4 and 5 are just meant to represent a simplistic process of assigning and using a respective type of conflictpoint.

FIG. 4 illustrates one implementation of the stages involved in using a conflictpoint on a variable in a particular program running under a transactional memory system. In one form, the process of FIG. 4 is at least partially implemented in the operating logic of computing device 100. The process begins at start point 270 with receiving input to assign a conflictpoint to a particular variable in a particular program running under a transactional memory system (stage 272). The system runs the particular program in a debug mode (stage 274) and stops execution if accesses to the particular variable induce a conflict (stage 276). The process ends at end point 278.

FIG. 5 illustrates one implementation of the stages involved in using a conflictpoint with a region of source code in a transaction. In one form, the process of FIG. 5 is at least partially implemented in the operating logic of computing device 100. The process begins at start point 290 with receiving input to assign a conflictpoint to a region of source code in a transaction in a particular program running under a transactional memory system (stage 292). The system runs the particular program in debug mode (stage 294) and stops execution if a conflict occurs between transactions that are executing the same region of source code (stage 296). The process ends at end point 300.

Figure 6:
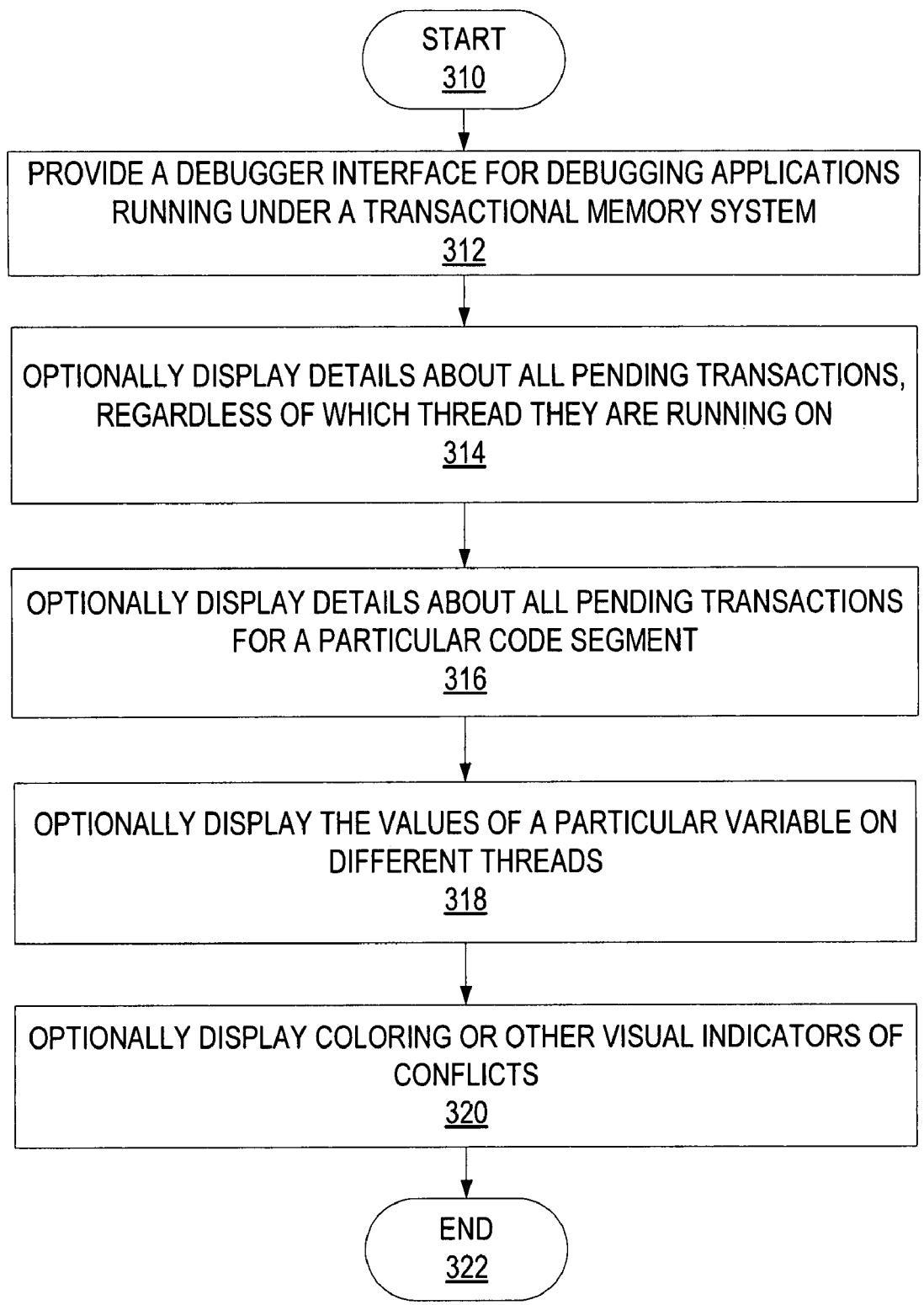
FIG. 6 is a process flow diagram for one implementation of the system of FIG. 1 illustrating the stages involved in providing a rich debugging environment for transactions.

FIG. 6 illustrates one implementation of the stages involved in providing a rich debugging environment for transactions. Note that while FIG. 6 describes various features that can be provided in the debugger, no particular order of the stages is intended or required. In one form, the process of FIG. 6 is at least partially implemented in the operating logic of computing device 100. The process begins at start point 310 with providing a debugger interface for debugging applications running under a transactional memory system (stage 312). The system optionally displays details about all pending transactions, regardless of which thread they are running on (stage 314). The system optionally displays details about all pending transactions for a particular code segment (stage 316). The system optionally displays the values for a particular variable on different threads (stage 318). The system optionally displays coloring or other visual indicators of conflicts (stage 320). Some, all, and/or additional features can be provided by the graphical user interface in other implementations. The process ends at end point 322.

Turning now to FIGS. 7-10, some simulated screens are shown to illustrate various types of information about transactions that can be viewed using transactional debugger application 200. These screens can be displayed to users on output device(s) 111. Furthermore, these screens can receive input from users from input device(s) 112. It will be appreciated that these screens are just non-limiting examples of transactional state, variable information, and/or other related debugging details that could be displayed for the transactions. Numerous other information details and/or user interface designs could also be provided in other implementations.

Figure 7:
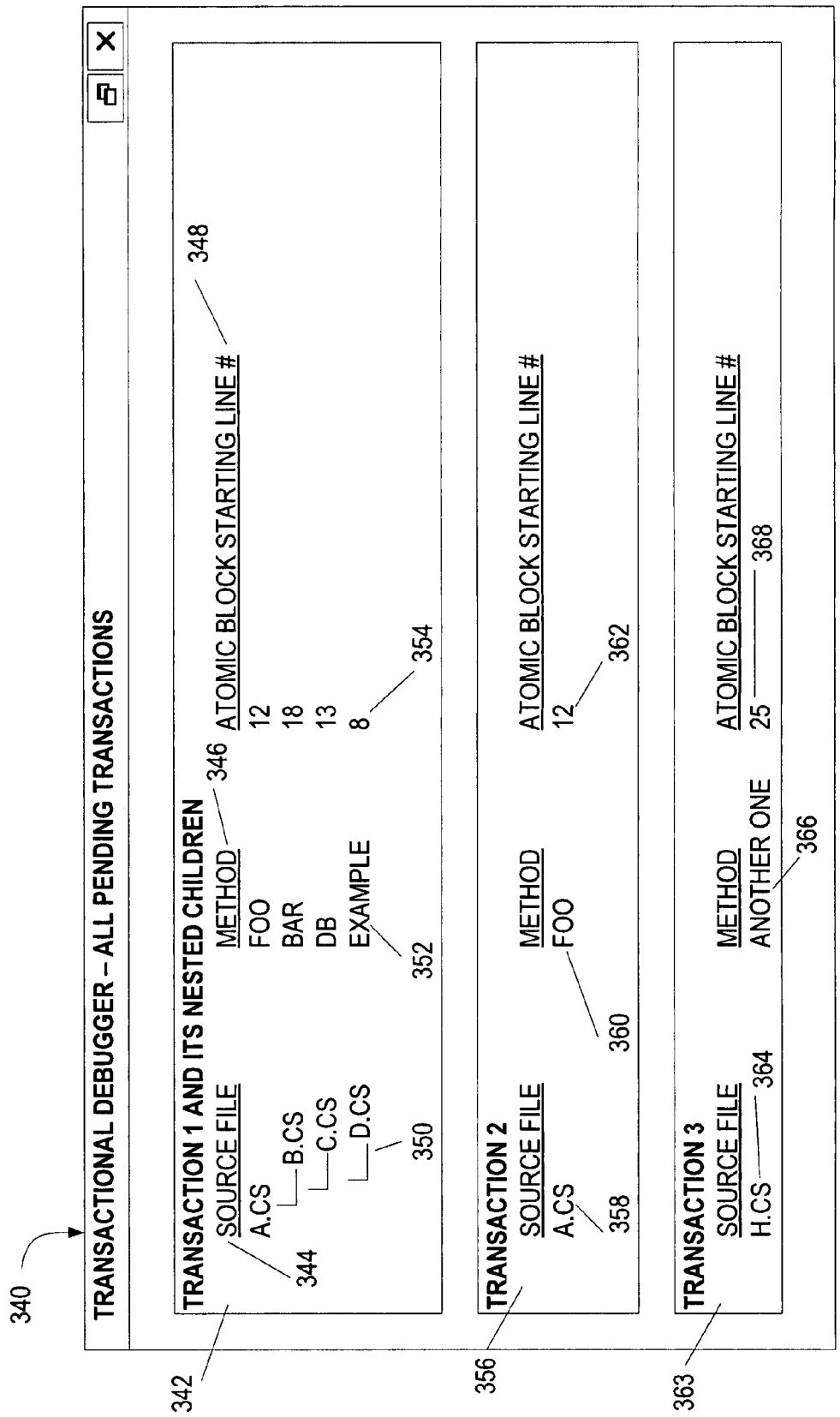
FIG. 7 is a simulated screen for one implementation of the system of FIG. 1 that illustrates the transactional state of multiple transactions.

FIG. 7 is a simulated screen 340 for one implementation that illustrates the transactional state of all pending transactions at the time the conflictpoint was encountered. In the hypothetical example shown, there are three pending transactions (342, 356, and 363, respectively). For each transaction, details about the source file 344, method name 346, and atomic block starting line number 348 are shown. For example, for the first transaction 342, the source files related to each of the nested children in the transaction are shown, along with their respective method names and atomic block starting line numbers. The nested child that was executing when the conflict occurred was in a source file named d.cs 350, which was associated with method called "Example" 352 that started on atomic block line number 8 (354). For the second transaction 356, the conflict occurred when a source file called a.cs 358 was executing a method called foo 360, with an atomic block that started on line number 12 (362). At conflict detection time, the third transaction was executing a method called "another one" 366 with an atomic block starting at line 25 (368) in a source file called h.cs 364. This transactional state and other information for all of the currently pending transactions can assist a user in determining why performance and/or other problems in the transactions are occurring.

Figure 8:
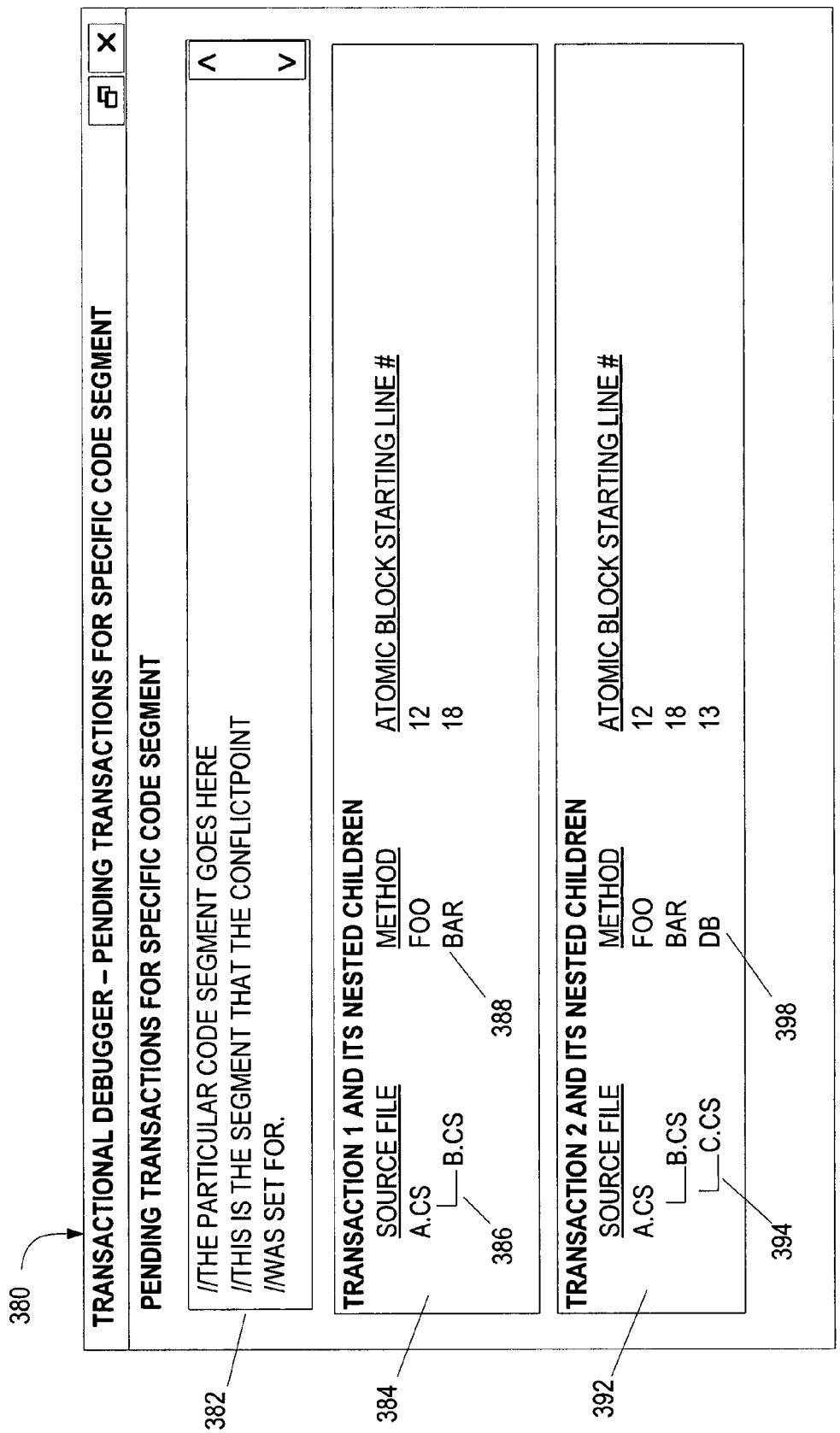
FIG. 8 is a simulated screen for one implementation of the system of FIG. 1 that illustrates the state of multiple transactions for a specific code segment.

FIG. 8 is a simulated screen 380 for one implementation that illustrates the state of multiple transactions for a specific code segment. The example of FIG. 8 is similar to the example of FIG. 7, only in this example, only the pending transactions for a specific code segment are shown. The particular code segment itself 382 can optionally be displayed on the screen for user reference. The first transaction 384 has a nested child that was executing a method called bar 388 in a source file called b.cs 386 when the conflict was detected. The second transaction 392 has a nested child that was executing a method called db 398 in a source file called c.cs 394 when the conflict was detected.

Figure 9:
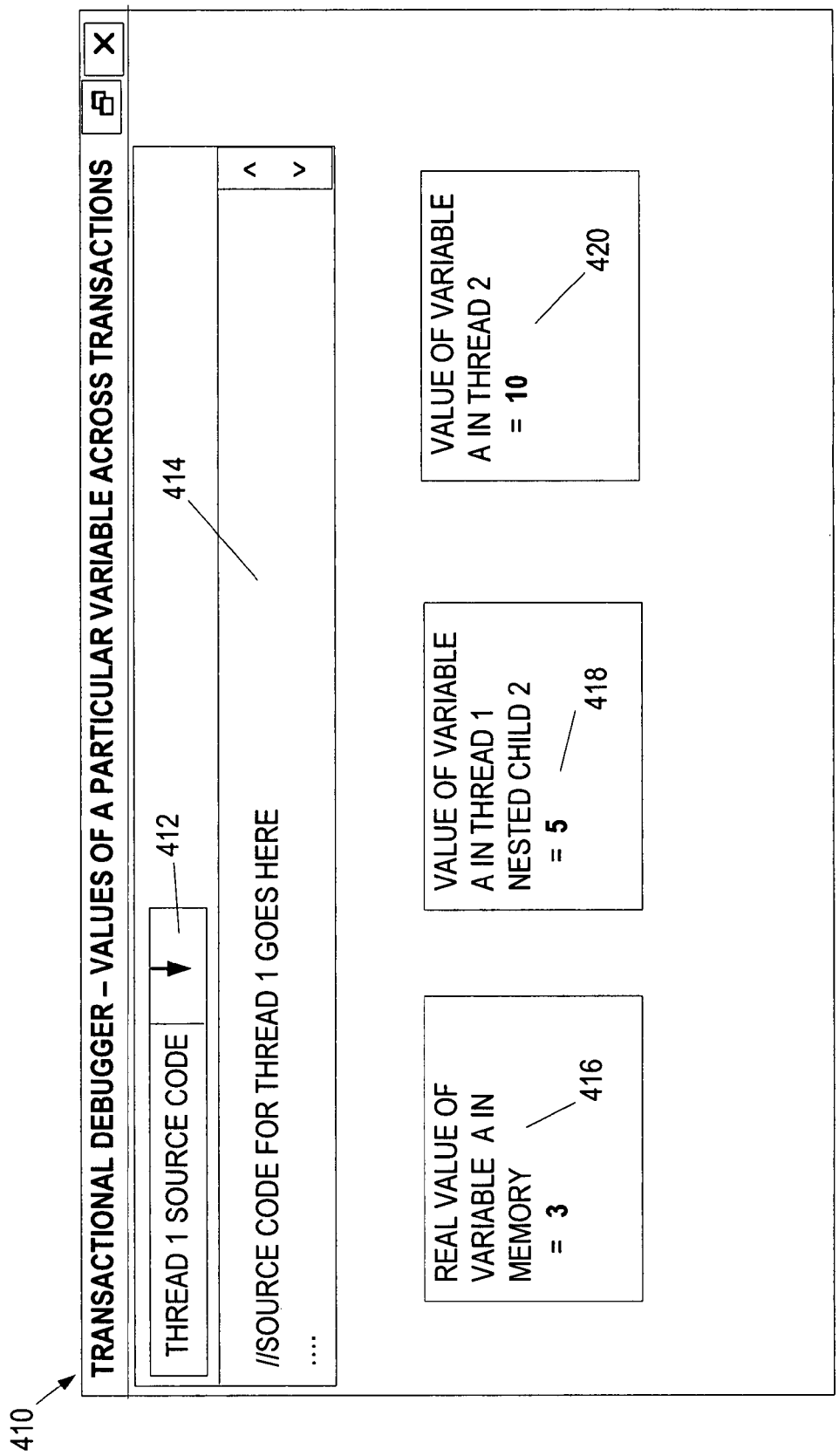
FIG. 9 is a simulated screen for one implementation of the system of FIG. 1 that illustrates the values of a particular variable on multiple threads.

FIG. 9 is a simulated screen 410 for one implementation that illustrates the values of a particular variable on multiple threads. The particular variable being displayed is one that had a conflictpoint assigned, and that then caused a conflict across threads. The value of the variable on each currently pending thread is shown (418 and 420), along with the real value of the variable in memory 416 at the present moment. Source code for a selected thread 412 can optionally be displayed in a source code region 414 on this or other screens.

Figure 10:
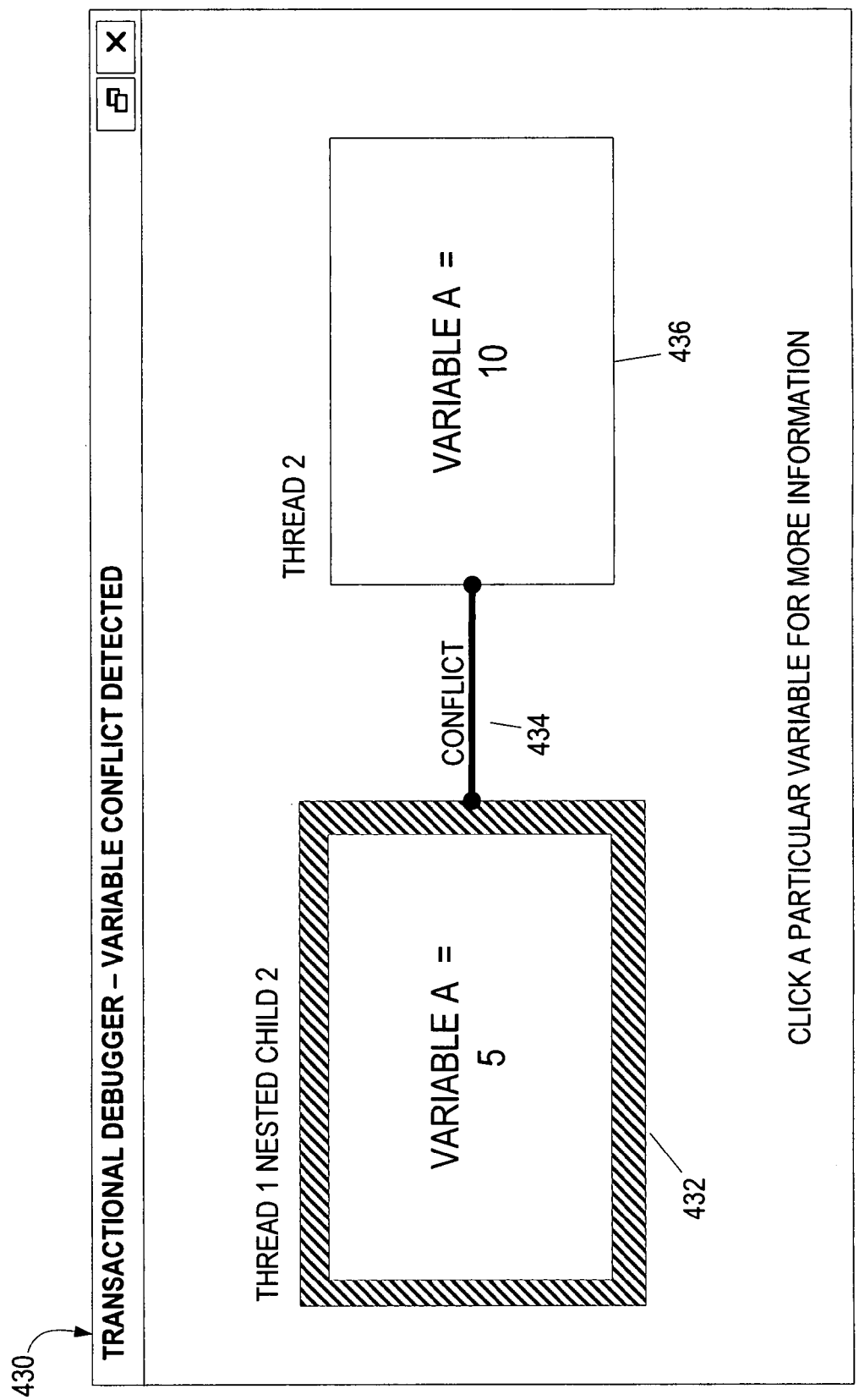
FIG. 10 is a simulated screen for one implementation of the system of FIG. 1 that illustrates using visual indicators to display where a conflict occurred between transactions.

FIG. 10 is a simulated screen 430 for one implementation that illustrates using visual indicators to display where a conflict occurred between transactions. In the hypothetical example shown, a conflict had occurred with a particular variable conflictpoint. Thus, the thread causing the conflict is shown with its current value of the variable visually indicated 432. The value of the variable on another thread 436 is also shown, as is an indicator that there was a conflict 434. In one implementation, the user can click on a particular variable (432 or 436) to review additional details about the variable, transactional state, etc. Numerous other types of visual indicators can be used to indicate that conflicts have been detected on a conflictpoints assigned to variables and/or regions of source code.

Figure 11:
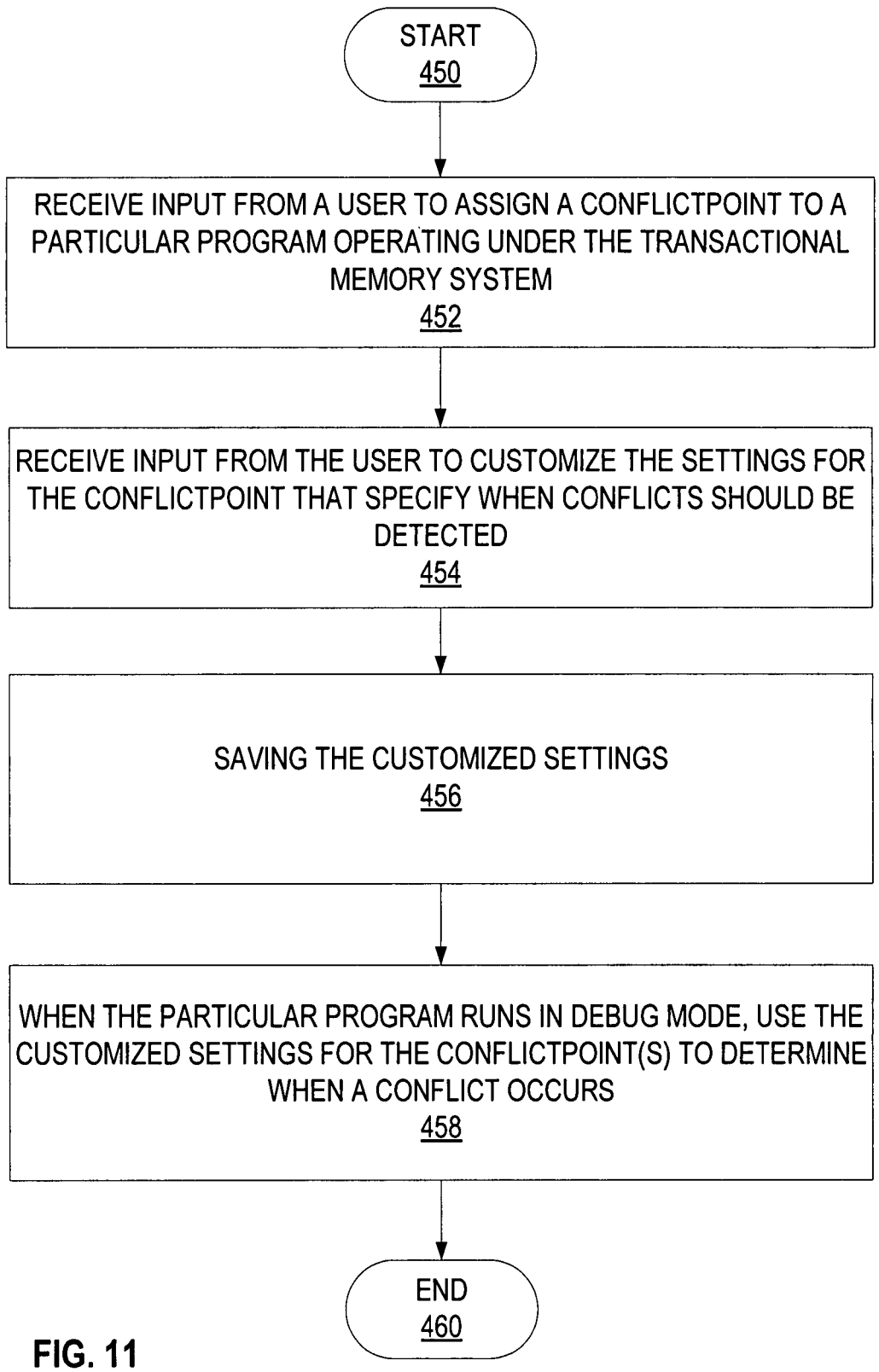
FIG. 11 is a process flow diagram for one implementation of the system of FIG. 1 that illustrates the stages involved in allowing a user to customize various settings for a particular conflictpoint.

FIG. 11 illustrates one implementation of the stages involved in allowing a user to customize various settings for a particular conflictpoint. In one form, the process of FIG. 11 is at least partially implemented in the operating logic of computing device 100. The process begins at start point 450 with receiving input from a user to assign a conflictpoint to a particular program operating under a transactional memory system (stage 452). The system receives input from a user to customize the settings for the conflictpoint that specify when conflicts should be detected (stage 454). The system saves the customized settings (stage 456). When the particular program runs in debug mode, the system uses the customized settings for the conflictpoint(s) to determine when a conflict occurs (stage 458). The process ends at end point 460.

Figure 12:
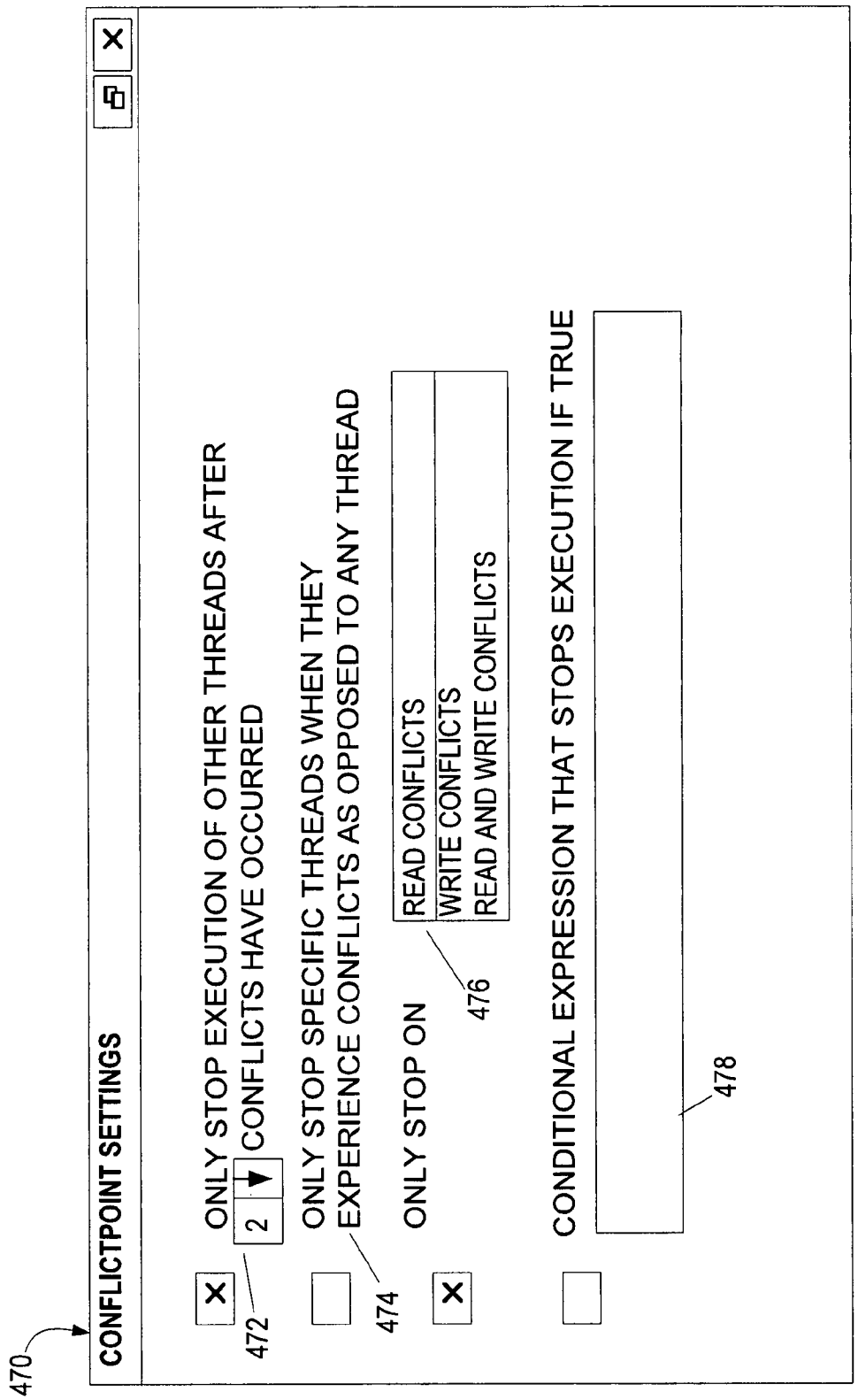
FIG. 12 is a simulated screen for one implementation of the system of FIG. 1 that illustrates allowing a user to customize various settings for a particular conflictpoint.

Turning now to FIG. 12, a simulated screen 470 for one implementation is shown that illustrates allowing a user to customize various settings for a particular conflictpoint. In the example shown, there are four different exemplary options that the user can select for the particular conflictpoint. The first option allows the user to specify how many conflicts 472 should have occurred before execution should be stopped. The second option allows the user to indicate that specific threads should only be stopped when they experience conflicts as opposed to any thread 474. The type of conflict that execution should stop on can also be specified 476, such as read conflicts, write conflicts, or both read and write conflicts. A conditional expression 478 can be specified that should cause execution to stop if the expression evaluates to true. While four examples are shown in FIG. 12, in other implementations, some, all, and/or additional conflictpoint settings could be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A computer storage medium having computer-executable instructions for causing a computer to perform steps comprising:
   providing a transactional debugger application for debugging programs running under a transactional memory system;
   using the transactional debugger application, detecting an occurrence of conflict on a conflictpoint set in at least one program running under the transactional memory system, wherein the conflict is between transactions;
   because of the detected conflict, stopping execution of the at least one program running under the transactional memory system; and
   displaying information related to the detected conflict occurrence, wherein the information displayed includes multiple concurrent values of a particular variable that are tentatively held by different threads.

2. The computer storage medium of claim 1, wherein the information displayed includes details about all pending transactions in the program.

3. The computer storage medium of claim 1, wherein the information displayed includes details about all pending transactions for a particular code segment.

4. The computer storage medium of claim 1, wherein the information displayed includes one or more visual indicators of the conflict.

5. The computer storage medium of claim 1, wherein execution of the program is stopped when the conflict is detected.

6. The computer storage medium of claim 1, wherein a user can assign the conflictpoint to a region of source code in a transaction.

7. The computer storage medium of claim 1, wherein a user can assign the conflictpoint to a particular variable in the program.

8. The computer storage medium of claim 1, wherein a user can customize settings for the conflictpoint that specify when the conflictpoint should be detected.

9. A method for debugging transactions using conflictpoints on regions of code comprising the steps of:
   using a processing unit, receiving input to assign a conflictpoint to a region of source code in a transaction in a particular program that runs under a transactional memory system;
   when running the particular program in a debug mode, using the processing unit, stopping execution if a conflict occurs between transactions that are executing the region of source code; and
   displaying information related to the conflict, wherein the information displayed includes multiple concurrent values of a particular variable that are tentatively held by different threads.

10. The method of claim 9, wherein the region of code is a single line of code.

11. The method of claim 9, wherein the region of code includes multiple lines of code.

12. The method of claim 9, wherein the information includes a transactional state of each transaction involved in the conflict.

13. The method of claim 9, wherein the transactional information includes a transactional state for all transactions pending at a time the conflict was detected.

14. A computer-readable medium having computer-executable instructions for causing a computer to perform the steps recited in claim 9.

15. A method for debugging transactions using conflictpoints on variables comprising the steps of:
   using a processing unit, receiving input to assign a conflictpoint to a particular variable in a particular program that runs under a transactional memory system; and
   when running the particular program in a debug mode, using the processing unit, stopping execution if accesses to the particular variable induce a conflict; and
   displaying information related to the conflict, wherein the information displayed includes multiple concurrent values of a particular variable that are tentatively held by different threads.

16. A computer-readable medium having computer-executable instructions for causing a computer to perform the steps recited in claim 15.

* * * * *